(12) United States Patent
Ikeno et al.

(10) Patent No.: US 7,426,113 B2
(45) Date of Patent: Sep. 16, 2008

(54) ELECTRONIC DEVICE

(75) Inventors: Takahiro Ikeno, Seto (JP); Yasutake Yamaguchi, Chiryu (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 0 days.

(21) Appl. No.: 11/517,893

(22) Filed: Sep. 8, 2006

(65) Prior Publication Data

US 2007/0058353 A1    Mar. 15, 2007

(30) Foreign Application Priority Data

Sep. 9, 2005    (JP)    ............... 2005-261510

(51) Int. Cl.
*H05K 5/00* (2006.01)
(52) U.S. Cl. .................. 361/752; 361/683; 361/684; 361/685
(58) Field of Classification Search ......... 361/752–753, 361/683–685; 455/90
See application file for complete search history.

(56) References Cited

U.S. PATENT DOCUMENTS 5,192,082 A * 3/1993 Inoue et al. ............... 463/44
6,819,550 B2 * 11/2004 Jobs et al. ............... 361/683
2003/0086240 A1 * 5/2003 Jobs et al. ............... 361/683
2004/0090474 A1 * 5/2004 Ogushi et al. ............... 347/3

FOREIGN PATENT DOCUMENTS

| JP | 7-282204 | 10/1995 |
|---|---|---|
| JP | 2002150225 | 5/2002 |
| JP | 2004310496 | 11/2004 |

* cited by examiner

*Primary Examiner*—Tuan Dinh
*Assistant Examiner*—Abiy Getachew
(74) *Attorney, Agent, or Firm*—Reed Smith LLP

(57) ABSTRACT

An electronic device including a slot unit to which a memory medium is inserted. The electronic device is able to read out image data from the memory medium inserted to the slot unit. The slot unit includes a panel mounted to the front of the electronic device where the panel has a surface swelled toward the front side of the electronic device. The slot unit further includes a memory medium accommodating portion provided in the panel which on the swelled surface has an opening to which the memory medium is inserted. A mark representing the type of the memory medium to be inserted into the opening is provided at a position of the swelled surface corresponding to the upper side of the opening.

11 Claims, 10 Drawing Sheets

Fig.4
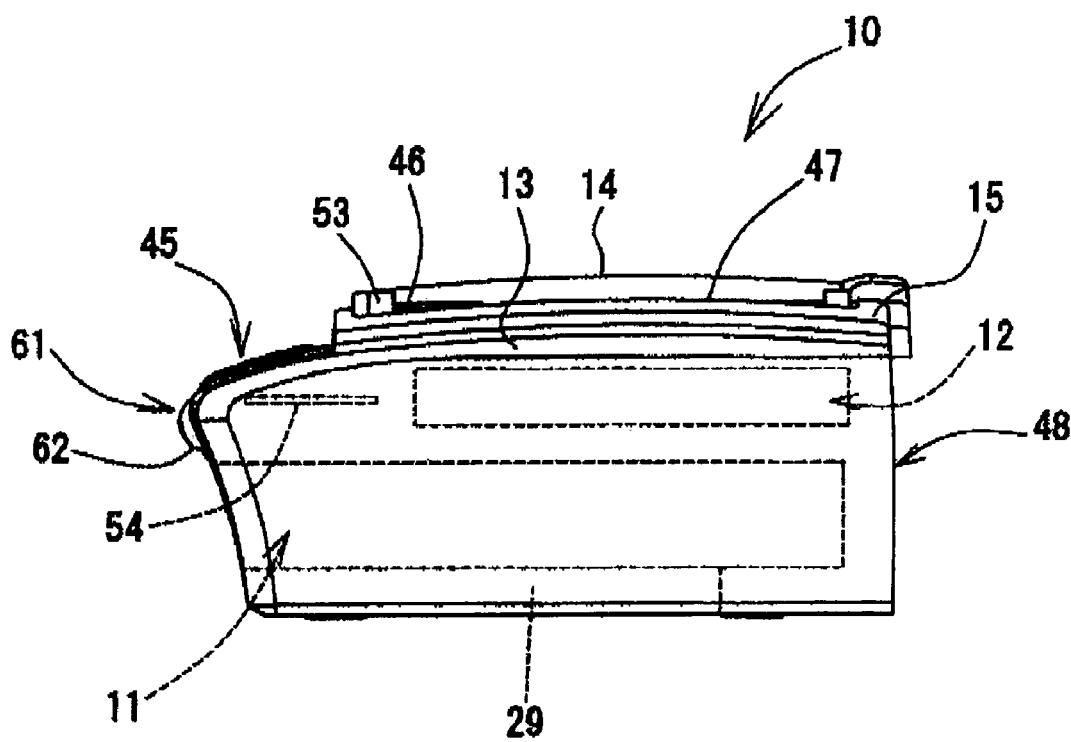
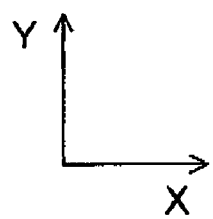

ELECTRONIC DEVICE

The present invention is based on Japanese Patent Application No. 2005-261510 filed Sep. 9, 2005, the contents of which are incorporated by reference.

BACKGROUND OF THE INVENTION

1. Field of the Invention

The present invention relates to a structure of an electronic device having a slot unit for mounting a memory medium at a front thereof.

2. Discussion of Related Art

In the related art, there is an electronic device which is provided with a slot unit for mounting a recording medium such as a compact memory card. The compact memory card can store image data or the like. When the compact memory card is connected to the slot unit, the electronic device can read the image data from the compact memory card. If the electronic device is provided with a recording unit which can record the image on a recording medium, such as a sheet of paper or the like, the image can be recorded on the basis of the read image data. The slot unit has an opening, for example, at the front of the electronic device and the compact memory card is adapted to be inserted from this opening.

In this manner, when the slot unit is provided with the above-described opening, entering of dust or the like into the interior of the opening must be avoided. It is also necessary that the operation to insert and remove the compact memory card into and from the opening can be performed easily. Therefore, the structure of the slot unit to which the memory medium such as the compact memory card is inserted has been improved in various manners. For examples of such improvements, see JP-A-7-282204, JP-A-2002-150225, and JP-A-2004-310496.

Slot units developed in recent years have a plurality of openings into which memory cards of different types can be inserted. In this case, the user has to determine into which opening the corresponding memory card should be inserted.

Therefore, a need has arisen to provide an electronic device where the user can recognize at a glance (1) the position of the slot unit, (2) the positions of the openings provided in the slot unit, and (3) the types of memory medium to be inserted into the openings.

SUMMARY OF THE INVENTION

In one embodiment of the invention, an electronic device is provided that comprises a slot unit to which a memory medium is inserted. The electronic device is able to read out image data from the memory medium inserted to the slot. The slot unit comprises a panel mounted to the front of the electronic device and having a surface swelled toward the front side of the electronic device, and a memory medium accommodating portion provided in the panel and having on the swelled surface an opening to which the memory medium is inserted. A mark representing the type of the memory medium to be inserted into the opening is provided at a position of the swelled surface corresponding to the upper side of the opening.

In this electronic device, the memory medium (typically, a compact memory card) can be mounted to the slot unit. Then, image data stored in the memory medium is read out. A user of the electronic device holds the memory medium, inserts the memory medium into the opening of the panel of the slot unit, and places the memory medium in the memory medium accommodating portion. Generally, the electronic device is placed on a desk, and the user operates the electronic device while standing or sitting in front thereof in many cases. Therefore, since the user usually operates the electronic device while looking downward, the user might not be able to recognize easily the position of the opening of the panel of the slot or the type of the compact memory card which can fit the slot. However, according to one embodiment of the invention, since the slot unit includes the panel having the swelled surface, the position of the slot unit can be recognized by the user immediately at a glance. In addition, since the mark is provided at a position of the swelled surface corresponding to the upper side of the opening, the position of the opening to which the memory medium is inserted and the type of the memory medium which can fit the opening can be recognized by the user immediately at a glance.

Preferably, the swelled surface is configured with a curved surface swelled toward the front side of the electronic device. Since the swelled surface is formed into the curved surface, when the user makes an attempt to insert the memory medium into the opening while groping for the opening with his/her hand, the user can easily find the position of the opening simply by sliding the memory medium along the surface of the panel.

Preferably, the panel is formed with a guiding surface that extends from a peripheral edge of the opening outwardly of the electronic device in the shape of a funnel. In this configuration, when the user makes an attempt to insert the memory medium into the opening while groping for the opening with his/her hand, the memory medium is guided to the opening only by sliding the memory medium along the guiding surface. In other words, the memory medium can be inserted into the opening while being guided by the guiding surface only by moving the memory medium to the position in the vicinity of the opening by the user.

Preferably, the guiding surface is configured with the curved surface depressed inwardly toward opening. Accordingly, the memory medium can be guided to the opening quite smoothly by bringing the memory medium held by the user into abutment with the guiding surface.

Preferably, a lower edge portion of the opening is projected toward the front side of the electronic device with respect to an upper edge portion of the opening so as to form a placing surface on which the memory medium can be placed at least when being inserted. In this configuration, when the user inserts the memory medium into the opening, the user can place the memory medium on the placing surface and insert the same into the opening. Accordingly, there is an advantage that the operation to insert the memory medium into the opening is more facilitated for the user. This advantage is obvious in particular when the user inserts the memory medium into the opening while groping for the opening with his/her hand, as described above.

Preferably, the panel is provided with (1) a plurality of memory medium accommodating portions to which memory media of different types can be mounted, and (2) a plurality of marks at positions of the swelled surface corresponding to upper sides of openings of the memory medium accommodating portions. In this configuration, the user can correctly and quickly determine into which openings the respective memory media should be inserted. This is particularly the case when a plurality of memory medium accommodating portions are provided, and the types of memory media to be inserted into the openings of the respective memory medium accommodating portions are different.

Preferably, the electronic device further comprises (1) an image scanning unit that includes (a) a top surface on which a contact glass plate for placing a document is disposed, and (b) an operating surface continuing from the top surface toward the front of the electronic device, and having an operating panel disposed thereon; (2) a recording unit which can record an image on a recording medium; and (3) an output port for outputting the recording medium on which the image has been recorded by the recording unit. The slot unit is provided between the operation panel and the output port, and the memory medium accommodating portion is disposed horizontally from the front of the electronic device inwardly of the image scanning unit.

The memory medium is formed into a sheet-shape or a thin plate shape in many cases. In this configuration, the memory medium is inserted horizontally from the front inwardly toward the image scanning unit. In addition, the slot unit is provided between the operation panel and the output port of the recording medium. Therefore, the thickness of the electronic device can be reduced and the electronic device can be designed to a compact thin shape.

According to one embodiment of the invention, the user can easily confirm the position of the slot unit, the position of the opening provided on the slot unit, and the type of the memory medium to be inserted into the opening. Therefore, the insertion and removal operation of the memory medium into and from the opening is quite easy, and consequently, the usability of the electronic device is improved.

BRIEF DESCRIPTION OF THE DRAWINGS

FIG. 4 is a right side view of the multi-function device according to the embodiment of the invention.

DETAILED DESCRIPTION OF EMBODIMENTS

Figure 1:
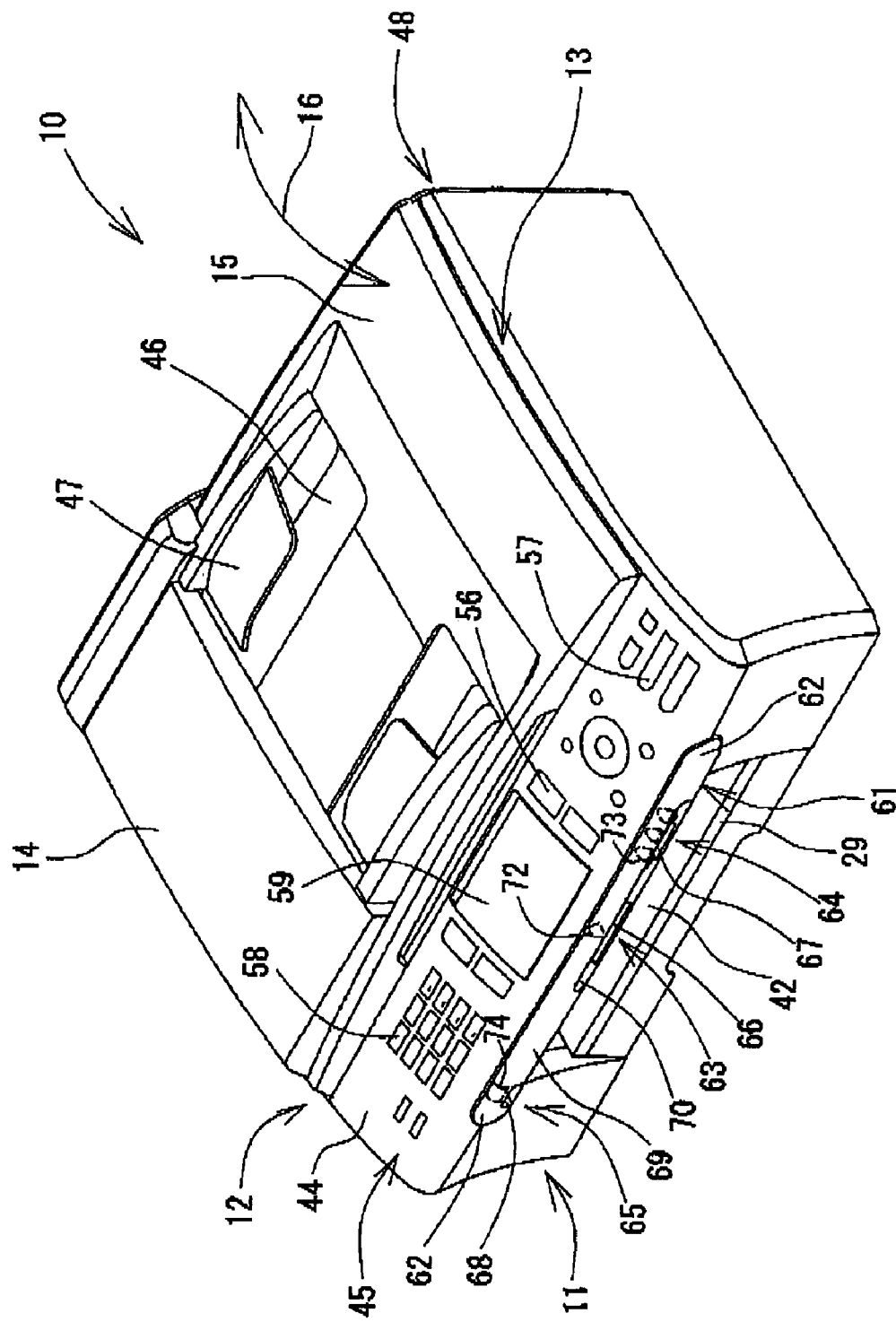
FIG. 1 is an appearance perspective view of a multi-function device according to an embodiment of the invention.

Referring now to the drawings, the invention will be described in detail on the basis of one or more exemplary embodiments.

Referring to FIG. 1, a multi-function device 10 is provided integrally with a printer 11 (recording unit) on the lower side of the device 10, and a scanner 12 (image scanning unit) on the upper side of the device 10. The multi-function device 10 has a printing function, a scanning function, a copying function, and a facsimile function. The electronic device according to this embodiment of the invention is configured as the multi-function device 10. However, the electronic device according to another embodiment of the invention can be a device in which the printer 11 and the scanner 12 are not mounted. An example of this embodiment would include a card reader/writer which can read/record the image data with respect to a plurality of memory media.

The multi-function device 10 is usually connected to a computer (not shown) so as to record images or text on a recording medium, such as a sheet of paper, based on the image data or the text data transmitted from the computer. The multi-function device 10 may be connected to external equipment such as a digital camera, and is capable of recording the image data outputted from the digital camera onto the recording medium. The multi-function device 10 is also provided with a slot unit 61 (described later). Image data, or the like, stored in the memory medium can be recorded on the recording medium by mounting the respective memory medium, such as a memory card, to the slot unit 61. The configuration of the multi-function device 10 (described below) is only an example of the electronic device according to one embodiment of the invention, and can be changed in design as needed within the scope of the invention.

Referring to FIG. 2 through FIG. 6, the multi-function device 10 according to this embodiment has a surface 69 of the slot unit 61 that is swelled toward the front of the multi-function device 10. Marks indicating the type of the compact memory card to be inserted into the slot unit 61 are provided on the upper side of the surface 69. Accordingly, the user of the multi-function device 10 can recognize the position to insert the compact memory card at a glance.

Figure 7:
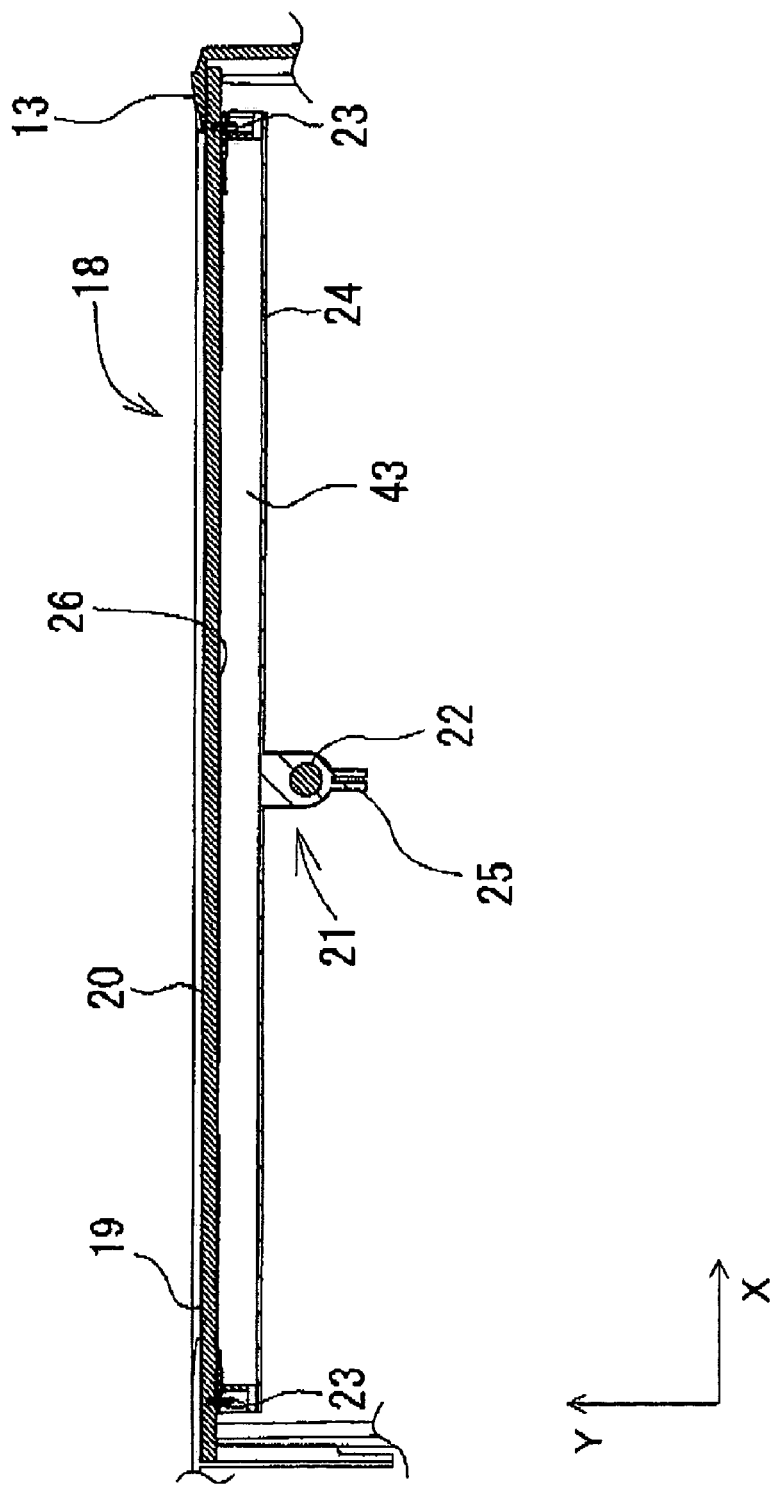
FIG. 7 is a schematic diagram showing an internal configuration of a scanner of the multi-function device according to the embodiment of the invention (a portion indicated by a broken line in FIG. 4).

As shown in FIG. 1, FIG. 4, and FIG. 7, the scanner 12 includes a document placing portion 13 functioning as an FBS (Flatbed Scanner), and a document cover 15 provided thereto. The document cover 15 includes an automatic document feeder 14 (hereinafter, referred to as ADF), and is mounted to a back surface 48 side of the document placing portion 13 so as to be openable and closable via a hinge. Therefore, the document cover 15 is openable and closable by being rotated in the direction of an arrow 16 with respect to the document placing portion 13. In this embodiment, the document placing portion 13 is configured with a housing of the multi-function device 10, and the document cover 15 constitutes a part of the upper surface of the multi-function device 10.

In this embodiment, the scanner 12 and the printer 11 (recording unit) are integrally formed. However, it is also possible that the scanner 12 and the printer 11 are separately provided. In one such example, the scanner 12 may be openable and closable with respect to the printer 11. In this case, since the scanner 12 is openable with respect to the printer 11, removal of jammed sheets can be done easily.

The document placing portion 13 also serves as a frame of the scanner 12. A contact glass plate 20 is provided on a top surface 19 (see FIG. 7) of the document placing portion 13. An image scanning unit 18 is provided in the interior of the document placing portion 13. The direction perpendicular to the XY plane of FIG. 7 corresponds to the width direction of the multi-function device 10, and corresponds to the direction perpendicular to the XY plane of FIG. 4.

The contact glass plate 20 is exposed by opening the document cover 15 provided on the document placing portion 13. The document is placed on the contact glass plate 20, and then the document cover 15 is closed. Accordingly, the document is sandwiched and fixed between the document cover 15 and the contact glass plate 20. When the image scanning unit 18 moves along, and underneath, the contact glass plate 20 (along the direction perpendicular to the XY plane of FIG. 7), the image is read from the document.

As shown in FIG. 7, the image scanning unit 18 includes a CIS (Contact Image Sensor) unit 21, a guide shaft 22, a roller unit 23, and a belt drive mechanism (not shown). The CIS unit 21 is arranged so as to oppose to the rear surface 26 of the contact glass plate 20. The CIS unit 21 is provided with a housing 43 of an elongated parallelepiped shape, and the housing 43 is fitted to a carriage 24. The CIS unit 21 irradiates light on the document from the rear surface 26 side of the contact glass plate 20, receives reflected light from the document, and converts the received light into electrical signals.

The guide shaft 22 extends in the direction perpendicular to the XY plane of FIG. 7. The guide shaft 22 penetrates through a lower end portion 25 of the carriage 24. The CIS unit 21 is supported by the guide shaft 22, and can be slid along the contact glass plate 20 while being guided by the guide shaft 22. The belt drive mechanism is provided with an endless annular belt (typically, a timing belt) driven, for example, by a motor. A part of the endless annular belt is connected to the lower end portion 25 of the carriage 24. Therefore, when the belt drive mechanism is operated, the carriage 24 is moved together with the endless annular belt. Consequently, the CIS unit 21 slides along the guide shaft 22, and is moved under the contact glass plate 20.

A roller unit 23 is provided at both ends of the CIS unit 21. The roller unit 23 comes into abutment with the rear surface 26 of the contact glass plate 20. In association with the movement of the carriage 24, the roller unit 23 rotates along the rear surface 26 of the contact glass plate 20, in the direction of movement of the carriage 24. As such, the roller unit 23 supports a smooth movement of the CIS unit 21.

In this embodiment, the image scanning unit 18 reads and scans an image with the CIS unit 21. However, the image scanning unit 18 may employ an image sensor of a reduction optical system, such as a CCD (Charge Coupled Device) instead of the CIS (Contact Image Sensor). Although the CIS unit 21 is driven by the endless annular belt in this embodiment, an ended belt fixed at both ends to the carriage 24 may be employed instead of the endless annular belt.

As shown in FIG. 1, the document cover 15 of this embodiment is provided with the ADF (automatic document feeder) 14. The ADF 14 continuously transports the document from a document tray 46 to an output tray 47. A mechanism for continuously carrying the document is integrated in the document cover 15. Since the ADF has a known structure, the detailed description will be omitted. The ADF is not critical to the current invention, and may be omitted if desired.

The document cover 15 is connected to the scanner 12 via a hinge provided on a back face 48 side of the document placing portion 13, and rotates along the arrow 16 in both directions. Therefore, the document cover 15 can be changed in posture between a closed posture which covers the top surface 19 (see FIG. 7) of the document placing portion 13 and an opened posture which exposes the top surface 19. Generally, the user sets the printing mode, such as the number of copies or the resolution, manually by the use of an operation panel 45. Next, the user opens the document cover 15, places the document on the contact glass plate 20, and fixes the document on the contact glass plate 20 by closing the document cover 15. The user then operates operating keys 57 (described later) to issue an instruction to start the image recording. When the image recording is terminated, the user changes the posture of the document cover 15 from the closed posture to the opened posture to take out the document.

Figure 8:
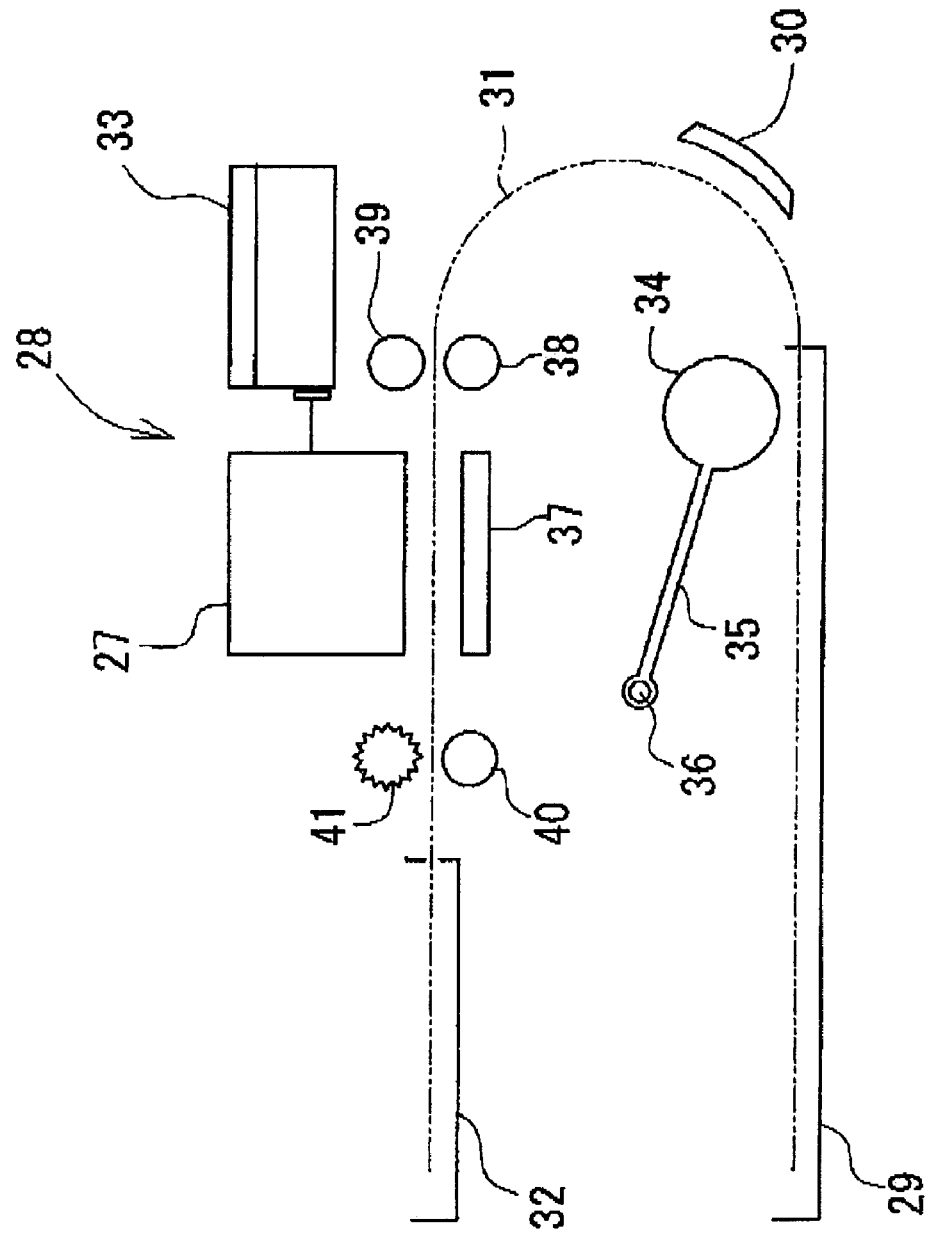
FIG. 8 is a schematic diagram showing an internal configuration of a printer of the multi-function device according to the embodiment of the invention (portion shown by a broken line in FIG. 4).

In FIG. 8, the direction perpendicular to the XY plane of FIG. 8 corresponds to the width direction of the multi-function device 10, and corresponds to the direction perpendicular to the XY plane of FIG. 4. As shown in FIG. 4 and FIG. 8, the printer 11 is provided with (1) a frame configured with the document placing portion 13, and (2) an image recording unit 28 having an inkjet recording head 27. Thus, in this embodiment, the printer 11 is configured as an inkjet recording device. Although the printer 11 is configured as an inkjet recording device in this embodiment, it is not limited thereto. For example, the printer 11 may be configured as an image forming device in which toner is attached to a latent image formed on a photoreceptor with a laser beam (laser printer). In another example, the printer may be configured as an image forming device which prints by heat-treating a heat sensitive sheet and changing the color of the sheet (thermal printer).

As shown in FIG. 8, the printer 11 is provided with an ink tank 33. The ink tank 33 stores black ink, yellow ink, magenta ink, and cyan ink independently, and is adapted to supply ink of the respective colors to the inkjet recording head 27.

Figure 2:
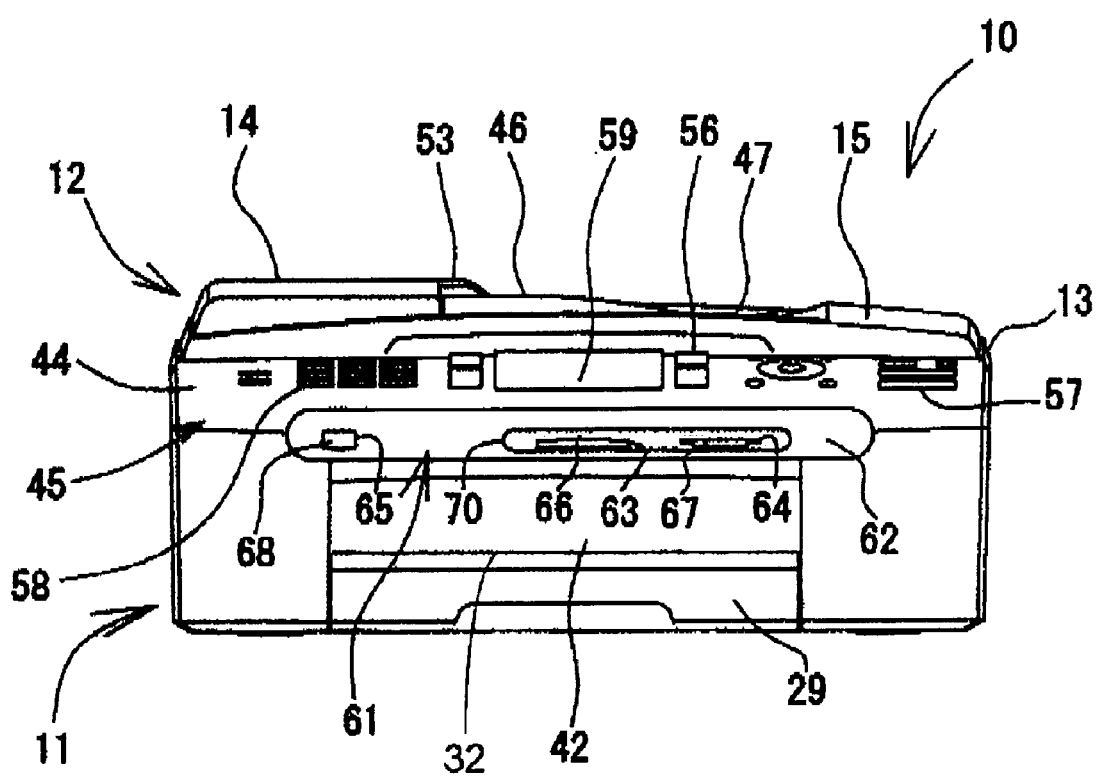
FIG. 2 is a front of the multi-function device according to the embodiment of the invention.

As shown in FIG. 1 and FIG. 2, the document placing portion 13 is provided with an opening 42 (output port) at the front thereof, and a sheet feed tray 29 is arranged in the interior of the opening 42. As shown in FIG. 8, the sheet fed from the sheet feed tray 29 is outputted to an output tray 32 provided above the sheet feed tray 42 in the opening 42 after the image is recorded thereon in the manner described later. An inclined separation plate 30 is disposed on the inner side (right side in the drawing) of the sheet feed tray 29. The inclined separation plate 30 separates the sheets stacked on the sheet feed tray 29 and guides the same upward. A sheet transport path 31 is formed upward from the inclined separation plate 30. The sheet transport path 31 extends upward and curves leftward, and extends from the back side toward the front side of the multi-function device 10. The sheet transport path 31 passes through the image recording unit 28 and communicates with the output tray 32. Therefore, the sheet stored in the sheet feed tray 29 is guided by the sheet transport path 31 upward from below so as to U-turn and reach the image recording unit 28. After the image recording unit 28 performs the image recording on the sheet transported through the sheet transport path 31, the sheet is outputted to the output tray 32.

A sheet feed roller 34 is provided on the upper side of the sheet feed tray 29. The sheet feed roller 34 separates the sheets stacked on the sheet feed tray 29 one by one and feeds them to the sheet transport path 31. The structure of the sheet feed roller 34 is known and, in this embodiment, the sheet feed roller 34 is supported at the distal end of a sheet feed arm 35 via a shaft. The sheet feed arm 35 can be moved upward and downward so as to come into and out of contact with the sheet feed tray 29. The sheet feed roller 34 is connected with the motor via a drive transmission mechanism (not shown). The drive transmission mechanism can be configured with a plurality of gears engaged with each other. When the motor is operated, the drive force is transmitted to the sheet feed roller 34 to rotate the sheet feed roller 34. The rotating sheet feed roller 34 feeds the sheet to the sheet transport path 31.

The sheet feed arm 35 is supported by a proximal shaft 36 and is capable of rotating about the proximal shaft 36. Accordingly, the sheet feed arm 35 can be pivoted about the proximal shaft 36 as a center of pivotal movement. The sheet feed arm 35 is urged toward the sheet feed tray 29 by a sheet feed clutch and a spring or the like (not shown) when the sheet feed tray 29 is mounted, and is urged away from the sheet feed tray 29 when the sheet feed tray 29 is removed. When the sheet feed arm 35 is rotated downward, the sheet feed roller 34, supported at the distal end thereof via a shaft, comes into a press-contact with the surface of the sheet on the sheet feed tray 29. When the sheet feed roller 34 is rotated in this state, a frictional force between the roller surface of the sheet feed roller 34 and the sheet itself feeds the uppermost sheet to the inclined separation plate 30. The fed sheet comes into abutment at the leading end thereof with the inclined separation plate 30 and, guided upward thereby, is fed to the sheet transport path 31. When the uppermost sheet is fed by the sheet feed roller 34, the sheet immediately below may be fed together by friction or the action of static. However, this sheet is held back by abutment with the inclined separation plate 30.

The sheet transport path 31 is defined by an outer guide surface and an inner guide surface opposed to each other at a predetermined distance at a portion other than the portion where the image recording unit 28 and the like are arranged. In this multi-function device 10, the outer guide surface is configured by an inner wall surface of the frame of the printer 11 configured with the document placing portion 13, and the inner guide surface is configured by the surface of the guide member provided in the frame. In particular, at a position where the sheet transport path 31 is bent, a transport roller may be provided. The transport roller is not shown in the drawing, but the transport roller may be mounted rotatably on a revolving shaft extending in the width direction of the sheet feed path 31 (perpendicular to the XY plane of FIG. 8). The transport roller is mounted so that the roller surface is exposed to the outer guide surface or the inner guide surface. With the provision of the transport roller, the sheet comes into abutment with the guide surface even at the curved portion of the sheet feed path 31 and hence can be transported smoothly.

The image recording unit 28 is provided on the downstream side of a portion of the sheet feed path 31 after U-turned upward from below. A platen 37 is provided so as to oppose the ink jet recording head 27. The transported sheet is fed to the platen 37. The ink jet recording head 27 discharges ink drops on the sheet arranged on the platen 37. The ink jet recording head 27 is mounted to the carriage (not shown). The carriage is slid in the direction perpendicular to the XY plane of FIG. 8 by a CR motor. The position and the sliding movement of the inkjet recording head 27 are observed by a carriage encoder (not shown). The ink jet recording head 27 discharges ink of the respective colors as ink drops while being slid, thereby recording an image on the sheet.

A drive roller 38 and a presser roller 39 are provided on the upstream side of the sheet transport path 31 of the inkjet recording head 27. The drive roller 38 is adapted to be driven to rotate by an LF motor (not shown). The drive roller 38 and the presser roller 39 nip the sheet transported in the sheet transport path 31, and when the drive roller 38 is rotated, the sheet is fed to the downstream side of the sheet transport path 31 and placed on the platen 37. The transport of the sheet is observed by a sheet transport encoder (not shown). More specifically, the sheet transport encoder includes an encoder disk provided on a revolving shaft of the drive roller 38 and a photosensor which reads the pulse from the rotating encoder disk. Therefore, the number of rotations of the drive roller 38 is detected by the sheet transport encoder, whereby the transport distance of the sheet can be obtained.

An output roller 40 and a presser roller 41 are provided on the downstream side of the sheet transport path 31 of the inkjet recording head 27. The output roller 40 is adapted to be rotated by the LF motor driving the drive roller 38. Accordingly, the output roller 40 is synchronously driven with the drive roller 38 via an interlocking mechanism (not shown). The output roller 40 and the presser roller 41 nip the sheet on which the ink drops are discharged, and the output roller 40 is rotated so that the sheet is fed toward the downstream side of the sheet transport path 31. The transport of the sheet in this case is also observed by the sheet transport encoder. Therefore, the sheet transport encoder detects the number of rotations of the output roller 40 via the drive roller 38, whereby the transport distance of the sheet is obtained.

The presser roller 39 is resiliently urged against the drive roller 38 so as to press the drive roller 38 by a predetermined pressing force. Therefore, when the sheet enters between the drive roller 38 and the presser roller 39, the presser roller 39 is drawn backward by an amount corresponding to the thickness of the sheet and nips the sheet in cooperation with the drive roller 38. In this manner, since the sheet is nipped by the drive roller 38 and the presser roller 39, the rotational force of the drive roller 38 is reliably transmitted to the sheet. The presser roller 41 is also provided in the same manner with respect to the output roller 40. However, in this embodiment, since the presser roller 41 is brought into a press contact with the sheet after the image is recorded, the roller surface is formed into a spur shape so as not to deteriorate the image recorded on the sheet.

The sheet nipped between the drive roller 38 and the presser roller 39 is transported intermittently on the platen 37 by a predetermined line feed amount. The inkjet recording head 27 is slid upon each line feed of the sheet, and records the image from the leading end side of the sheet. The sheet on which the image is recorded is nipped by the output roller 40 and the presser roller 41 from the leading end side thereof. The sheet is intermittently transported by the predetermined line feed amount in a state of being nipped between the output roller 40 and the presser roller 41 at the leading end side, and between the drive roller 38 and the presser roller 39 at the trailing end side, and while being transported in this manner, the image is recorded by the inkjet recording head 27. After the recording of the image on a predetermined area of the sheet, the output roller 40 is continuously driven to rotate, and the sheet nipped between the output roller 40 and the presser roller 41 is outputted to the output tray 32.

Figure 3:
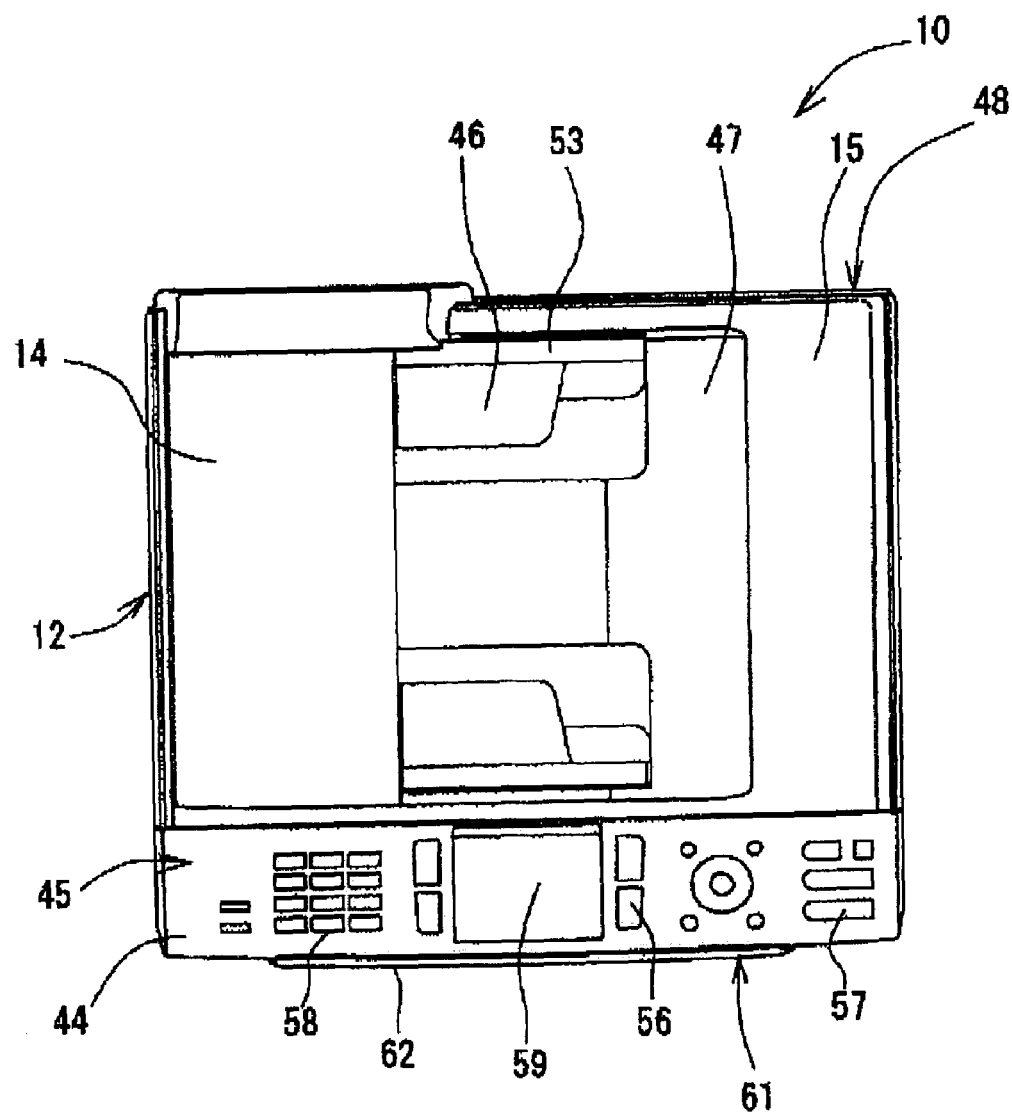
FIG. 3 is a plan view of the multi-function device according to the embodiment of the invention.

As shown in FIG. 1 to FIG. 3, an operation panel 45 is mounted to an upper inclined surface of the document placing portion 13 which constitutes the frame of the printer 11. The operation panel 45 is a device for operating the printer 11 or the scanner 12, and is provided with various operating buttons, an LCD (liquid crystal display), described later, and the like on an upper surface 44 (operating surface). A control device for controlling the operation of the printer 11, the scanner 12, and the movement of the entire multi-function device 10 is provided at the lower part of the document placing portion 13.

As shown in FIG. 4, a control substrate 54 is disposed below the operation panel 45 (in the interior of the document placing portion 13). The various operating buttons arranged on the operation panel 45 are connected to the control substrate 54 via a flat cable (not shown). The control substrate 54 is connected to the control device, and the control device processes a command from the various operating buttons to control the operation of the multi-function device 10.

As shown in FIG. 1, the operation panel 45 is provided with various operating keys 56 to 58 and an LCD 59. The user of the multi-function device 10 inputs a desired command with the operation panel 45. The multi-function device 10 performs a predetermined operation in response to a predetermined input. As described above, a personal computer or the like can be connected to the multi-function device 10. In this case, the multi-function device 10 can additionally be operated by an instruction transmitted from the personal computer via a scanner driver or a printer driver.

As shown in FIGS. 1 and 3, the LCD 59 is a laterally elongated rectangle, where the vertical dimension thereof is slightly smaller than the depth of the operation panel 45. In other words, the LCD 59 is upsized to a dimension which can be arranged on the operation panel 45. With the employment of the upsized LCD 59, visibility of characters, images, and the like displayed on the LCD 59 is improved. The LCD 59 is arranged at a lateral center of the operation panel 45. Therefore, the width of the LCD 59 is sufficiently small with respect to the width of the operation panel 45. The operating keys 56 to 58 are arranged on both left and right sides of the LCD 59.

As the user faces the operation panel 45, operating keys 56 are provided around the LCD 59, operating keys are 57 provided on the right side of the operation panel 45, and operating keys 58 are provided on the left side of the operation panel 45.

The operating keys 56 are located in two rows along the side edges of the LCD 59, with one row on the left side and one row on the right side of the LCD 59. In this manner, the space on the sides of the LCD 59 can be used efficiently. The operating keys 56 are mode keys for switching the respective modes, such as a facsimile mode, a copy mode, and a scan mode, and also serve as setting keys for various settings in the respective modes. As such, a plurality of inputs are assigned to the operation keys 56, with the contents to be inputted by the respective operating keys 56, when being pressed by the user, displayed on the LCD 59.

The operating keys 57 include (1) a power key for turning the power of the multi-function device 10 ON and OFF, (2) a navigation key for searching registered telephone numbers or abbreviated dialing numbers, changing the talking volume and the volume of the alarm sound or the key-touch tone, or selecting the various settings, (3) a start key to start the image recording or the image scanning, and (4) a stop key for entering interruption of the various processes. The operation keys 58 include dialing keys for entering the telephone number, or the number of copies. The types of the operating keys 57, 58 shown here are illustrative only, and other functions may be assigned as a matter of course.

The LCD 59 is mounted in such a manner that the surface thereof is flush with the surface of the operation panel 45. Therefore, the LCD 59 does not project from the upper surface of the operation panel 45, and hence the appearance of the operation panel 45 is improved. In addition, the visibility of the display on the LCD 59 from above of the multi-function device 10 is improved.

As shown in FIG. 1 and FIG. 2, the slot unit 61 is disposed at the front of the multi-function device 10. A memory medium such as various compact memory cards can be mounted to the slot unit 61. The compact memory card stores image data. That image data is read from the compact memory card mounted in the slot unit 61, and information relating the image data is displayed on the LCD 59. An arbitrary image displayed on the LCD 59 is recorded on the sheet by the printer 11. The input therefore is performed with the operation panel 45.

Figure 5:
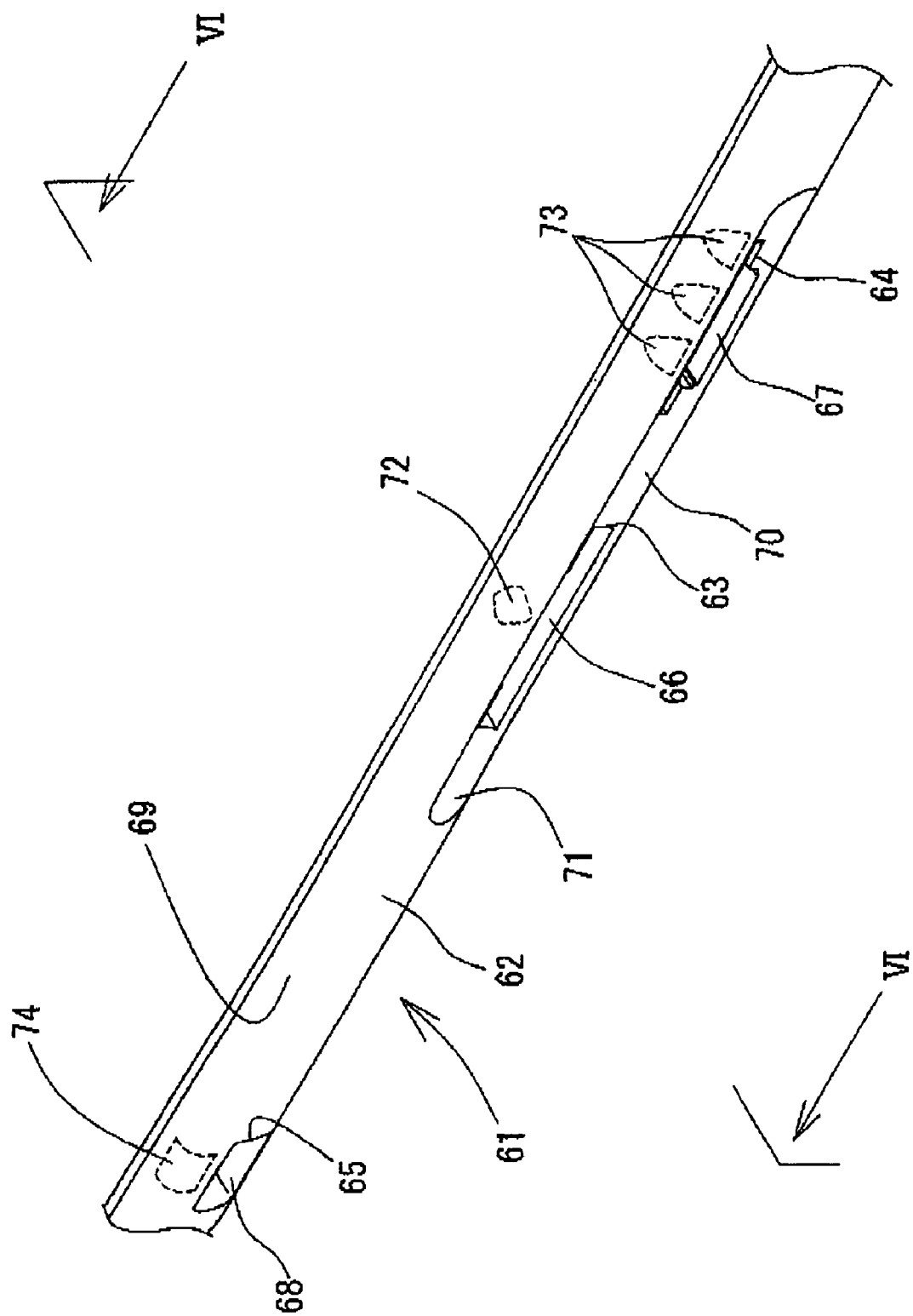
FIG. 5 is an enlarged perspective view of a slot unit of the multi-function device according to the embodiment of the invention.
Figure 6:
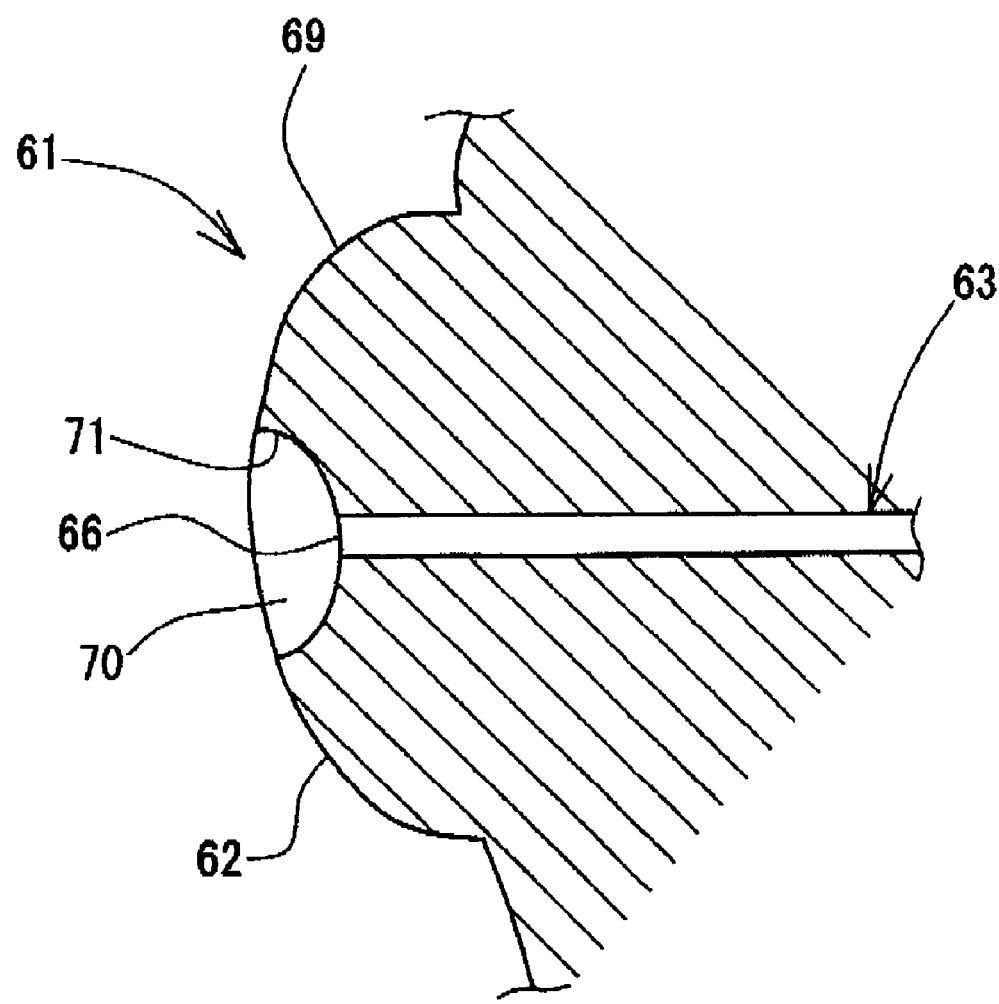
FIG. 6 is an enlarge cross-sectional view of the slot unit of the multi-function device according to the embodiment of the invention (cross-sectional view taken along VI-VI in FIG. 5).

As shown in FIG. 1, FIG. 5, and FIG. 6, the slot unit 61 includes (1) a panel 62 mounted to the front of the multi-function device 10, (2) memory medium accommodating portions 63, 64 provided on the panel 62 and arranged in the interior of the document placing portion 13, and (3) a USB (Universal Serial Bus) connector 65.

The panel 62 is formed into an elongated band shape, and is arranged on the lower front of the operation panel 45. The surface 69 of the panel 62 constitutes the surface of the slot unit 61. The surface 69 of the panel 62 is formed into a swelled surface which swells outward, that is, toward a front side of the multi-function device 10, as shown in FIG. 5 and FIG. 6. In this embodiment, the surface 69 of the panel 62 is formed into a curved surface which swells smoothly. However, the shape of the surface 69 of the panel 62 may be formed into an inclined straight surface which projects toward the front side of the multi-function device 10. Effects and advantages of the surface 69 of the panel 62 being formed into a swelled surface, which is either a curved surface or inclined straight surface that projects toward the front side of the multifunction device 10, will be described later.

The USB connector 65 is a connector for connecting a USB cable. The USB connector 65 is provided with a cable insertion port 68, to which a terminal of a USB cable may be fitted. The respective memory medium accommodating portions 63, 64 are provided with slots (openings) 66, 67 respectively, so that compact memory cards may be inserted through the respective slots 66, 67. The USB connector 65 and the memory medium accommodating portions 63, 64 are provided with terminals respectively on the inner side thereof. In this way, when the USB cable is fitted into the USB connector 65, the terminal of the USB cable is joined to the terminal of the USB connector 65. Similarly, when a compact memory card is fitted into one of the memory medium accommodating portions 63, 64, the terminal of the compact memory card is joined to a corresponding one of the terminals of the memory medium accommodating portions 63, 64.

A groove 70 extending longitudinally along the panel 62, that is, in the left and right directions of the multi-function device 10, is formed at a center portion of the panel 62. The slot 66 and the slot 67 are formed continuously from an inner peripheral surface 71 (guiding surface) of the groove 70. As shown in FIG. 6, the inner peripheral surface 71 of the groove 70 extends from the peripheral edges of the slots 66, 67 outwardly in the shape of a funnel. More specifically, the inner peripheral surface 71 is formed into a curved surface which connects the peripheral edge of the groove 70 and the peripheral edges of the slots 66, 67. This curved surface is formed so as to be depressed inwardly toward slots 66, 67. Therefore, the slots 66, 67 are arranged on the inner back of the groove 70 and are exposed from the groove 70, so that the various compact memory cards may be attached to, and detached from, the respective slots 66 to 68 from the front side. Effects and advantages of the inner peripheral surface 71 formed into the funnel shape will be described later.

In this embodiment, the inner peripheral surface 71 of the groove 70 extends from the peripheral edges of the slots 66, 67. However, it is also applicable if the groove 70 is omitted and the slots 66, 67 are exposed on the surface of the panel 62. The shape of the peripheral edges of the slots 66, 67 themselves may be formed into the funnel shape described above. In other words, the peripheral edges of the slots 66, 67 may also serve as the groove 70. Furthermore, the inner peripheral surface 71 of the groove 70 may not be formed into the curved surface and formed into a straight surface. Covers for closing the respective slots 66 to 68 may be detachably attached to the panel 62.

In this embodiment, the compact memory cards or the like, which have different standards, are mounted to the memory medium accommodating portions 63, 64. More specifically, an SD memory card, an xD-picture card, a CompactFlash® card, a SmartMedia® card, a Memory Stick®, and so on are inserted into the slots 66, 67, respectively, so that the data transmission as described above is performed between the respective compact memory card and the multi-function device 10. Still image data taken by a digital camera or moving image data taken by a digital video camera, for example, may be recorded in the compact memory cards. The compact memory cards are mounted to either of the slots 66, 67, according to their respective standard. Then, the respective image data stored in the respective compact memory cards is read to the control device via the respective terminals. Subsequently, the control device controls the operation of the printer 11 and records the image data as an image on the sheet.

Additionally, the USB connector 65 can be used to connect, via the USB cable, to a digital camera. The USB connector 65 can also be used to directly connect to a USB memory. The image data stored in the digital camera or USB memory is read to the control device and then the control device controls the printer 11 to record the image data on the sheet.

In this embodiment, two memory medium accommodating portions 63, 64 are provided. However, the number of the memory medium accommodating portions is not specifically limited, and the multi-function device 10 may be designed to provide more than two memory medium accommodating portions.

In addition, the memory medium accommodating portion 64 is adapted to fit three standards of compact memory cards, and the memory medium accommodating portion 63 is adapted to fit one standard of compact memory card. Therefore, the multi-function device 10 is adapted so that four standards of compact memory cards can be mounted. However, the number of standards is not specifically limited, and the multi-function device 10 may be designed so that more, or less, than four standards of compact memory cards may be accommodated.

The panel 62 is provided with marks 72, 73, corresponding to the respective slots 66, 67, which indicate the type of compact memory card to be inserted into the slots 66, 67. The respective marks 72, 73 are provided on the surface 69 of the panel 62, and are arranged at positions corresponding to the upper side of the respective slots 66, 67. The configuration of the respective marks 72 to 74 is not specifically limited. However, those which make the user of the multi-function device 10 recognize at a glance the type, or the standard, of the compact memory card to be inserted into the respective slots 66, 67 are preferable. More specifically, in this embodiment, characters of "SD", "M", and "xD" are provided at positions corresponding to the upper side of the slot 67 as the mark 73. The characters "SD" represent the SD memory card, the character "M" represents Memory Stick®, and the characters "xD" represent the xD-picture card, and these characters are provided in order to indicate that these compact memory cards can be mounted to the slot 66. Characters "CF" are provided on the upper side of the slot 66 as the mark 72. These characters represent CompactFlash® and indicate that a CompactFlash® card can be mounted to the slot 67. The panel 62 is also provided with mark 74 at a position corresponding to the upper side of the cable insertion port 68 of the USB connector 65. This mark 74 is configured as a pictogram which typically represents the USB terminal. Effects and advantages of the marks 72 to 74 provided as described above will be described later.

In the multi-function device 10, the compact memory card is mounted to the slot unit 61, and the image is recorded on the basis of the image data stored therein. The user of the multi-function device 10 holds the desired compact memory card and mounts the card into adaptable slot 66 or slot 67. In many cases, the multi-function device 10 is placed on a desk, and the user operates the multi-function device 10 while standing or sitting in front of the desk. Therefore, since the user usually operates the multi-function device 10 while looking downward, the user might not be able to recognize the position of the slots 66, 67 or the types of compact memory cards which can fit the respective slots 66, 67 easily.

However, in this multi-function device 10, since the marks 72, 73 are provided at positions corresponding to the respective slots 66, 67 on the surface 69 of the panel 62, the user can know the positions of the respective slots 66, 67 correctly. In addition, the marks 72, 73 are arranged on the upper sides of the respective slots 66, 67, on the surface 69 of the panel 62. Therefore, even when the user operates the multi-function device 10 while standing or sitting in front thereof, the user can view the marks 72, 73 easily, and can know the position of the respective slots 66, 67 quickly. Furthermore, since the marks 72, 73 are composed of the characters from which the types or the standards of the compact memory card to be inserted into the slots 66, 67 can be recognized at a glance, the user can find the slots 66, 67 to which the compact memory card should be inserted immediately at a glance. In the same manner, since the mark 74 is provided on the upper side of the cable insertion port 68 for the USB connector 65, the user can find the position where the USB cable should be inserted immediately at a glance.

In the multi-function device 10 according to this embodiment, since the surface 69 of the panel 62 is formed into a curved surface swelled toward the front side of the multi-function device 10, when the user makes an attempt to insert the compact memory card into the slots 66, 67 while groping with his/her hand, the user can find the positions of the slots 66, 67 easily by simply sliding the compact memory card along the surface 69 of the panel 62.

Since the inner peripheral surface 71 of the groove 70 formed on the panel 62 is formed into the funnel shape as described above, when the user makes an attempt to insert the compact memory card into the slots 66, 67 while groping with his/her hand, the compact memory card is guided to the slots 66, 67 by merely sliding the compact memory card along the inner peripheral surface 71. Therefore, the user can insert the compact memory card into the slots 66, 67 with extreme easiness. In particular, since the inner peripheral surface 71 is curved so as to be depressed inwardly toward slots 66, 67, the compact memory card can advantageously be guided to the slots 66, 67 more smoothly and reliably.

In particular, in this embodiment, the slot unit 61 is provided between the operation panel 45 and the opening 42 of the document placing portion 13. Furthermore, the respective memory medium accommodating portions 63, 64 are arranged horizontally on the inner side of the document placing portion 13. Additionally, in many cases, the compact memory card is formed into a sheet-shape or a thin plate shape. Therefore, in this multi-function device 10, the compact memory card is horizontally inserted into the inner side of the document placing portion 13 from the front between the operation panel 45 and the opening 42. Consequently, the thickness of the multi-function device 10 can be reduced and the multi-function device 10 can be designed to a compact thin shape.

Figure 9:
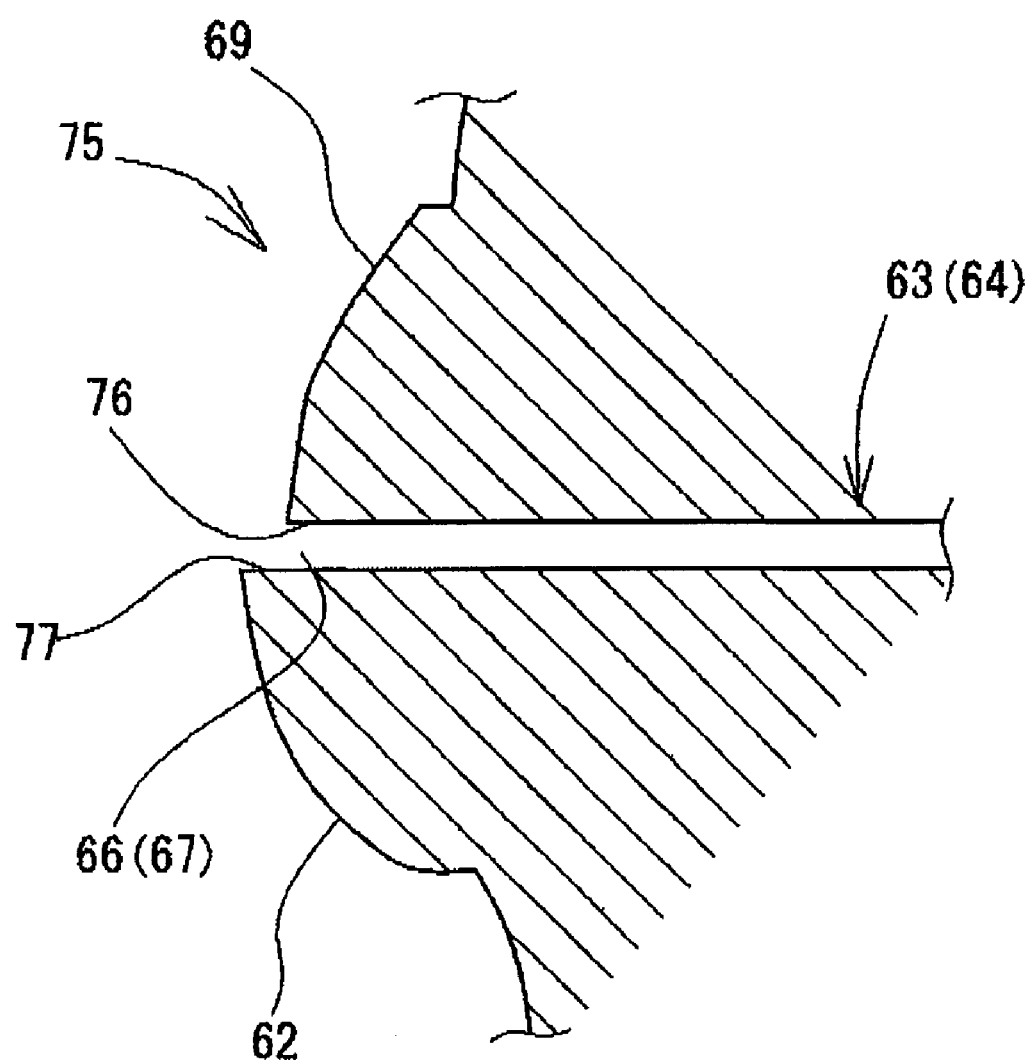
FIG. 9 is an enlarged cross-sectional view of a slot unit of the multi-function device according to a first modification of the embodiment of the invention.

As shown in the FIG. 9, there are differences between the configuration of the slot unit 75 in this modification and the configuration of the slot unit 61 of the previous embodiment. One difference is that, in the above-described embodiment (see FIG. 6), the groove 70 is formed so as to continue to the slots 66, 67 of the respective memory medium accommodating portions 63, 64. However, such groove is not formed in this modification. Another difference is that, in this modification, the lower edge portions 77 of the slots 66, 67 of the respective memory medium accommodating portions 63, 64 are projected toward the front side of the multi-function device 10 with respect to an upper edge portions 76 of the slots 66, 67.

In this manner, the lower edge portions 77 constitute placing surfaces for placing the compact memory cards when inserting the same into the slots 66, 67. Accordingly, the user can place the compact memory cards on the lower edge portions, 77 and then insert the compact memory cards into the respective slots 66, 67. This is an advantage, in that the operation to insert the compact memory cards into the respective slots 66, 67 is made easier for the user. Since the placing surfaces for the compact memory cards are formed by the lower edge portions 77, there is another advantage in that the memory cards inserted into the respective slots 66, 67 can be stably supported by the placing surfaces.

Figure 10:
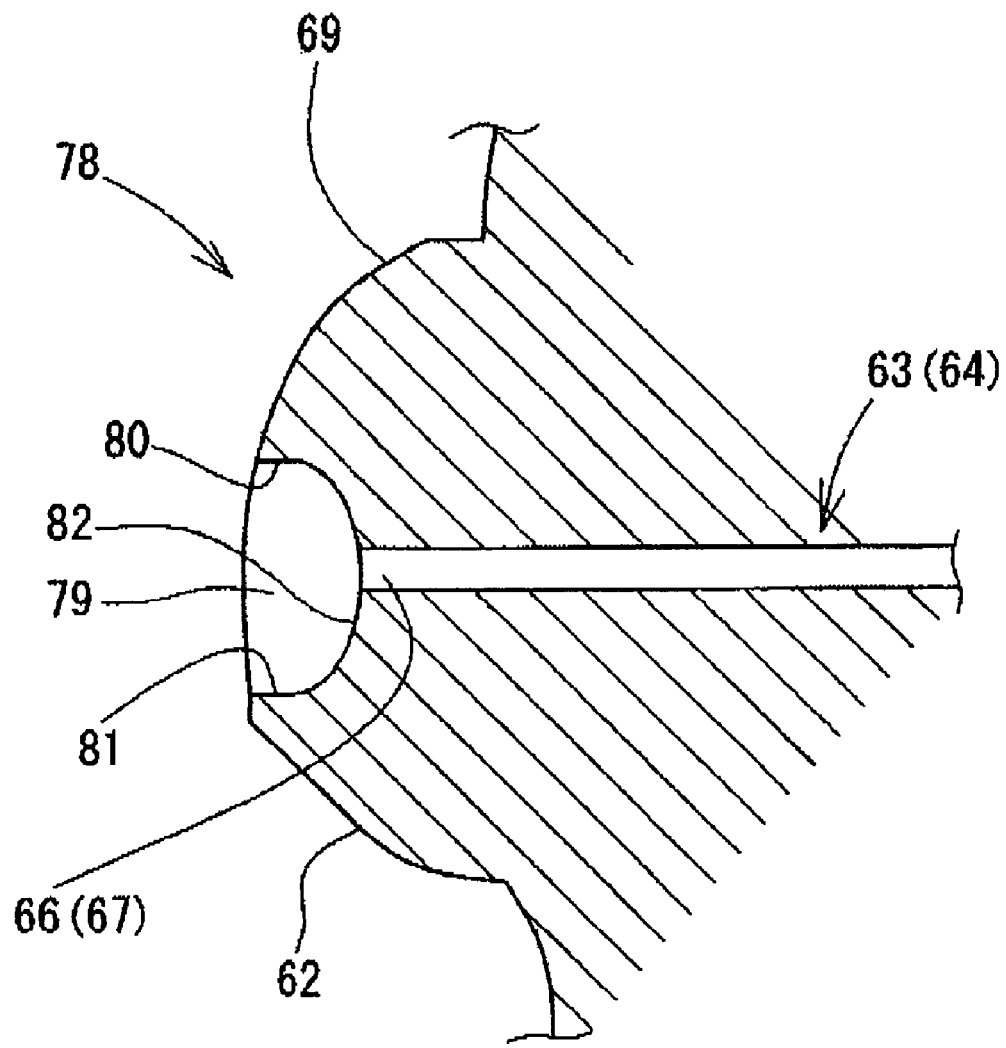
FIG. 10 is an enlarged cross-sectional view of a slot unit of the multi-function device according to a second modification of the embodiment of the invention.

Referring to FIG. 10, the differences in the configuration of the slot unit 78 according to this modification from the slot unit 75 in the first modification are that a groove 79 is formed so as to continue to the slots 66, 67 of the respective memory medium accommodating portions 63, 64. In this modification, the lower edge portion 81 of the groove 79 is projected toward the front side of the multi-function device 10 with respect to the upper edge portion 80.

In this manner, the lower edge portion 81 constitutes the placing surface for placing the compact memory cards when being inserted into the slots 66, 67. Accordingly, the user can place the compact memory cards on the lower edge portion 81, and then insert the compact memory cards into the respective slots 66, 67. In addition, the compact memory cards are guided smoothly to the respective slots 66, 67 while being guided by an inner peripheral surface 82 of the groove 79. This is an advantage, in that the operation to insert the compact memory card into the respective slots 66, 67 can further be facilitated for the user.

As described above, with the multi-function device 10 of the embodiment and the modifications, the user can confirm the positions of the respective slots 66, 67, as well as the type of compact memory card to be inserted into the respective slots 66, 67. This makes the inserting/pulling operation of the compact memory card very simple, and hence usability of the multi-function device 10 is improved.

The invention can also be applied to a card reader/writer or a multi-function device which can read/write data with respect to a memory medium. In addition, the panel of the slot unit need not necessarily be mounted to the front of the electronic device. The panel may be mounted to any portion of the electronic device. Examples of such portions include, but are not limited to, a side portion, a back portion, a top portion, and a bottom portion of the electronic device.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

What is claimed is:

1. An electronic device comprising:
    a slot unit to which a memory medium is inserted;
    an operation panel disposed at the front of the electronic device, the operation panel having an operation panel surface on which operation keys are mounted;
    wherein the electronic device is able to read out image data from the memory medium inserted to the slot unit;
    the slot unit comprising:
        a slot unit panel mounted to the front of the operation panel, the slot unit panel having a swelled surface which is separate and non-continuous from the operation panel surface and is swelled toward the front side of the electronic device away from the front of the operation panel; and
        a memory medium accommodating portion provided in the slot unit panel and having on the swelled surface an opening to which the memory medium is inserted;
    wherein a degree of swell of the swelled surface changes in a vertical direction of the slot unit panel;
    wherein a mark representing the type of the memory medium to be inserted into the opening is provided at a position of the swelled surface corresponding to the upper side of the opening.

2. The electronic device according to claim 1,
    wherein the slot unit panel is formed with a guiding surface that extends from the swelled surface of the slot unit panel to a peripheral edge of the opening inwardly of the electronic device in the shape of a funnel.

3. The electronic device according to claim 2,
    wherein the guiding surface is configured with a curved surface depressed inwardly of the electronic device toward the opening.

4. The electronic device according to claim 1,
    wherein the swelled surface is configured with a curved surface swelled toward the front side of the electronic device.

5. The electronic device according to claim 4,
    wherein the slot unit panel is formed with a guiding surface that extends from the swelled surface of the slot unit panel to a peripheral edge of the opening inwardly of the electronic device in the shape of a funnel.

6. The electronic device according to claim 5,
    wherein the guiding surface is configured with a curved surface depressed inwardly of the electronic device toward the opening.

7. The electronic device according to claim 1,
    wherein a lower edge portion of the opening is projected toward the front side of the electronic device with respect to an upper edge portion of the opening so as to form a placing surface on which the memory medium can be placed at least when being inserted to the slot unit.

8. The electronic device according to claim 1,
    wherein the slot unit panel is provided with a plurality of memory medium accommodating portions to which memory media of different types can be mounted, and a plurality of marks are provided at positions of the swelled surface corresponding to upper sides of openings of the memory medium accommodating portions.

9. The electronic device according to claim 1, further comprising:
    an image scanning unit including (1) a top surface on which a contact glass plate for placing a document is disposed, and (2) an operating surface continuing from the top surface toward the front of the electronic device, and having an operation panel disposed thereon;
    a recording unit which can record an image on a recording medium; and
    an output port for outputting the recording medium on which the image has been recorded by the recording unit;
    wherein the slot unit is provided between the operation panel and the output port, and the memory medium accommodating portion is disposed horizontally from the front of the electronic device inwardly of the image scanning unit.

10. The electronic device according to claim 1 wherein the slot unit further comprises:
   a USB (universal serial bus) connector provided in the slot unit panel; and
   a mark representing the USB connector is provided at a position of the swelled surface corresponding to the upper side of the USB connector.

11. The electronic device according to claim 1,
   wherein an apex of the swelled surface of the slot unit panel is located at a more front side of the electronic device than a peripheral edge of the opening, and
   wherein the slot unit panel is formed with a guiding surface between the apex and at least a part of the peripheral edge of the opening.

* * * * *